US012391363B2

(12) United States Patent
Kang et al.

(10) Patent No.: US 12,391,363 B2
(45) Date of Patent: Aug. 19, 2025

(54) METHOD OF CONTROLLING TILT ROTOR, APPARATUS FOR CONTROLLING TILT ROTOR, AND AIRCRAFT INCLUDING THE APPARATUS

(71) Applicant: KOREA AEROSPACE RESEARCH INSTITUTE, Daejeon (KR)

(72) Inventors: Youngshin Kang, Daejeon (KR); Am Cho, Daejeon (KR); Seongwook Choi, Daejeon (KR); Yushin Kim, Seoul (KR); Jongmin Bae, Sejong-si (KR); Junho Cho, Seoul (KR); Haneul Yun, Daejeon (KR); Myeong Kyu Lee, Daejeon (KR)

(73) Assignee: KOREA AEROSPACE RESEARCH INSTITUE, Daejeon (KR)

( * ) Notice: Subject to any disclaimer, the term of this patent is extended or adjusted under 35 U.S.C. 154(b) by 127 days.

(21) Appl. No.: 18/511,423

(22) Filed: Nov. 16, 2023

(65) Prior Publication Data
US 2024/0166333 A1  May 23, 2024

(30) Foreign Application Priority Data
Nov. 18, 2022  (KR) .......................... 10-2022-0155817

(51) Int. Cl.
*B64C 11/00* (2006.01)
*B64C 11/30* (2006.01)
(Continued)

(52) U.S. Cl.
CPC .......... *B64C 11/305* (2013.01); *B64C 13/503* (2013.01); *B64D 35/04* (2013.01); *B64C 27/52* (2013.01)

(58) Field of Classification Search
CPC ..... B64C 11/305; B64C 13/503; B64C 27/52; B64C 27/57; B64C 29/0033; B64D 35/04;
(Continued)

(56) References Cited

U.S. PATENT DOCUMENTS

| 2014/0252158 A1 | 9/2014 | Schaeffer |
| 2020/0088112 A1 | 3/2020 | Tang |

(Continued)

FOREIGN PATENT DOCUMENTS

| CN | 109878703 | 6/2019 |
| CN | 110254696 | 9/2019 |

(Continued)

*Primary Examiner* — Ian Jen
(74) *Attorney, Agent, or Firm* — Perman & Green, LLP (57) ABSTRACT

An apparatus for controlling a tilt rotor is provided. The apparatus includes a thrust command generator configured to generate a first collective pitch angle based on a throttle command, a rotation speed compensator configured to generate a compensation value based on a rotation speed of the motor, a compensation weight generator configured to generate weight values according to a flight speed, a collective pitch angle command generator configured to generate a collective pitch angle adjustment command of the rotor blade of the motor, based on the first collective pitch angle and a first compensation value being obtained by multiplying the compensation value by a preset conversion ratio and a first weight value, and a motor controller configured to generate a motor control command based on a second compensation value being obtained by multiplying the compensation value by a second weight value and the first collective pitch angle.

15 Claims, 9 Drawing Sheets

(51) Int. Cl.
  *B64C 13/50*   (2006.01)
  *B64D 35/04*   (2006.01)
  *B64C 27/52*   (2006.01)

(58) Field of Classification Search
  CPC ........ B64D 31/16; B64D 31/04; B64D 31/12;
                                                B64D 31/06
  See application file for complete search history.

(56) References Cited

U.S. PATENT DOCUMENTS

2020/0407060 A1* 12/2020 Hosseini ................. B64C 15/00
2023/0026233 A1   1/2023 Kang et al.

FOREIGN PATENT DOCUMENTS

| | | |
|---|---|---|
| JP | 2007331426 | 12/2007 |
| KR | 20150058197 | 5/2015 |
| KR | 20200080825 | 7/2020 |
| KR | 20210079734 | 6/2021 |
| KR | 102288881 | 8/2021 |
| KR | 20230095534 | 6/2023 |
| WO | 2020240567 | 3/2020 |
| WO | 2021125607 | 6/2021 |

\* cited by examiner

METHOD OF CONTROLLING TILT ROTOR, APPARATUS FOR CONTROLLING TILT ROTOR, AND AIRCRAFT INCLUDING THE APPARATUS

CROSS-REFERENCE TO RELATED APPLICATION

This application is based on and claims priority under 35 U.S.C. § 119 to Korean Patent Application No. 10-2022-0155817, filed on Nov. 18, 2022, in the Korean Intellectual Property Office, the disclosure of which is incorporated by reference herein in its entirety.

BACKGROUND

1. Field

The disclosure relates to an apparatus for controlling a tilt rotor, and more particularly, to an apparatus for controlling a tilt rotor including a motor and rotor blades.

2. Description of the Related Art

In an aircraft that uses an engine to supply power to a plurality of rotors (or propellers), power is mechanically transmitted through a drive shaft and a gear apparatus, and thus, there is no difference in the thrust generated by the rotors.

However, because a plurality of motors individually generate power in an aircraft (i.e., a tiltrotor aircraft) including a plurality of tilt rotors, it is difficult for the tilt rotors to generate a uniform thrust. The output of each motor should be corrected before the motor is mounted on an aircraft, and even after the output of the motor is corrected, a lot of compensation work is required to ensure that the motor generates a uniform output.

In the related art, an electric speed control (ESC) command from a motor is individually controlled to maintain the number of revolutions of the motor constant, but there is a risk of overloading the motor in vertical climb sections or high-speed flight sections where the load on the motor increases.

SUMMARY

The disclosure is to provide an apparatus for controlling each tilt rotor in an aircraft including a plurality of tilt rotors.

Additional aspects will be set forth in part in the description which follows and, in part, will be apparent from the description, or may be learned by practice of the presented embodiments of the disclosure.

According to an aspect, an apparatus for controlling a tilt rotor including a motor and a rotor blade includes a thrust command generator configured to receive an input of a throttle command and generate a first collective pitch angle based on the throttle command, a rotation speed compensator configured to generate a compensation value based on a target rotation speed and a current rotation speed of the motor, a compensation weight generator configured to generate a first weight value and a second weight value according to a flight speed, a collective pitch angle command generator configured to generate a final collective pitch angle adjustment command of the rotor blade, based on a first compensation value and the first collective pitch angle, the first compensation value being obtained by multiplying the compensation value by a preset conversion ratio (col/esc ratio) and the first weight value, and a motor controller configured to generate a motor control command based on a second compensation value and the first collective pitch angle, the second compensation value being obtained by multiplying the compensation value by the second weight value.

According to an example, the thrust command generator may be further configured to generate a second collective pitch angle by multiplying a weighted average value by a throttle command value corresponding to the throttle command, and generate the first collective pitch angle based on the second collective pitch angle, the weighted average value being obtained by weighted averaging a first maximum pitch angle based on a tilt angle of the tilt rotor and a second maximum pitch angle based on the tilt angle of the tilt rotor by using the first weight value and the second weight value.

According to another example, the thrust command generator may be further configured to generate the first collective pitch angle based on the second collective pitch angle and a first pitch adjustment angle, the first pitch adjustment angle being adjusted by a posture control command.

According to another example, when the tilt angle of the tilt rotor is 0, the first maximum pitch angle based on the tilt angle of the tilt rotor may be 0, and the second maximum pitch angle based on the tilt angle of the tilt rotor may be greater than 0, and as the tilt angle of the tilt rotor increases, the first maximum pitch angle based on the tilt angle of the tilt rotor and the second maximum pitch angle based on the tilt angle of the tilt rotor may increase.

According to another example, the motor controller may be further configured to generate the motor control command based on a value obtained by adding a third collective pitch angle, the first collective pitch angle, and the second compensation value, the third collective pitch angle being generated by multiplying, by the throttle command value, a value obtained by subtracting the weighted average value from a preset maximum collective pitch angle.

According to another example, the motor controller may be further configured to generate the motor control command based on a value obtained by adding the second compensation value and a motor control value preset according to a value obtained by adding the first collective pitch angle and the third collective pitch angle.

According to another example, the first weight value may be smallest between a first flight speed and a second flight speed and may be largest at a third flight speed, the third flight speed being greater than the first flight speed and the second flight speed, and a sum of the first weight value and the second weight value may be 1.

According to another example, the collective pitch angle command generator may be further configured to generate the final collective pitch angle adjustment command based on a value obtained by adding the first compensation value, the first collective pitch angle, and a second pitch adjustment angle preset according to the flight speed, wherein the second pitch adjustment angle may increase as the flight speed increases.

According to another example, the rotation speed compensator may include a first limiter configured to limit the target rotation speed such that the target rotation speed does not rapidly change according to an aircraft mode change, a second limiter configured to limit an error value within a preset range, the error value being generated based on a difference between the target rotation speed and the current rotation speed, and a controller configured to generate the compensation value based on at least one gain value among a proportional gain value, a differential gain value, and an integral gain value, the proportional, differential, and integral gain values being arbitrarily preset to the limited error value.

According to another example, the controller may be further configured to, in order for a value greater than or equal to a compensation value limit not to be accumulated, limit an integral value, or when an excess value greater than or equal to the compensation value limit occurs, remove the excess value.

According to another example, the controller may be further configured to, when the excess value is removed, remove a weighted average value obtained by multiplying excess values according to the first compensation value and the second compensation value by the first weight value and the second weight value, respectively, and then adding products.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure will be described in detail with reference to the accompanying drawings.

Before the disclosure is explained in detail, terms or words used herein should not be construed as being unconditionally limited to their ordinary or dictionary meanings, and the inventors of the disclosure may have appropriately defined and used the concepts of various terms in order to explain their disclosure in the best manner. Furthermore, it should be understood that these terms and words should be interpreted with meanings and concepts consistent with the technical idea of the disclosure. That is, the terms used herein are only used to describe the embodiments of the disclosure, and are not used with the intention of specifically limiting the description of the disclosure. It should also be understood that these terms are defined in consideration of various possibilities of the disclosure.

As used herein, the singular forms "a," "an," and "the" may be intended to include the plural forms as well unless the context clearly indicates otherwise. Similarly, it should be understood that even if the plural forms are used, they may include the singular forms.

As used herein, when an element is referred to as being "connected" to another element, it may be "directly connected" to the other element, but it will be understood to include that the element is "indirectly connected" to the other element with another element therebetween. Also, it will be understood that when an element is referred to as "including" another element, it may not exclude the other element but may further include the other element unless otherwise described.

In addition, the terms "first," "second," etc. used in the specification, claims, and drawings of the disclosure are intended to distinguish similar objects and are not intended to indicate a specific order or sequential order. It should be understood that objects may be interchanged under appropriate circumstances such that the embodiments of the disclosure may be practiced in a different order than that described above or shown in the drawings.

Moreover, the term " . . . or/er," "unit," "module," "apparatus," or the like used herein, when used, refers to a unit that may process one or more functions or operations. It should also be understood that the term " . . . or/er," "unit," "module," "apparatus," or the like may be implemented as hardware or software, or a combination of hardware and software.

In the drawings attached to the specification, the sizes, positions, connection relationships, etc. of elements constituting the disclosure may be exaggerated, reduced, or omitted in order to convey the idea of the disclosure sufficiently clearly or for convenience of explanation, and accordingly, the proportions or scales of the elements may not be precise.

Hereinafter, in the descriptions of the disclosure, elements that are deemed to unnecessarily obscure the essence of the disclosure, for example, well-known technologies including the related art, may not be described in detail.

Figure 1:
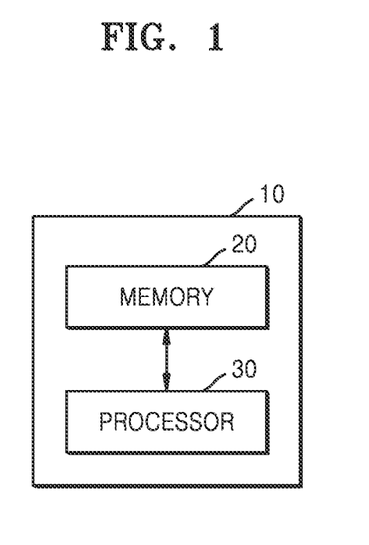
FIG. 1 is a schematic diagram of an internal configuration of a computing apparatus that executes an apparatus for controlling a tilt rotor, according to the disclosure.

FIG. 1 is a schematic diagram of an internal configuration of a computing apparatus that executes an apparatus for controlling a tilt rotor, according to the disclosure.

Referring to FIG. 1, a computing apparatus 10 includes a processor 20 and a memory 30.

The processor 20 controls overall operations of the computing apparatus 10. The processor 20 performs basic arithmetic, logic, and input/output operations. For example, the processor 20 may execute a program code stored in the memory 30, for example, a code or computer program for executing a method of controlling a tilt rotor according to the disclosure. The processor 20 may be implemented as one or more integrated circuit chips.

The memory 30 is a recording medium readable by the processor 20 and may include a permanent mass storage apparatus such as random access memory (RAM), read-only memory (ROM), or a disk drive. At least one program or application code may be stored in the memory 30.

The processor 20 may execute the method of controlling a tilt rotor according to the disclosure. In the specification, the tilt rotor includes a motor and a plurality of rotor blades rotated by the motor. In the tilt rotor, a rotation axis of the motor may rotate from a horizontal direction to a vertical direction, and an angle at which the rotation axis rotates is referred to as a tilt angle. When the tilt angle is 0°, the rotation axis of the motor is placed in the horizontal direction, and when the tilt angle is 90°, the rotation axis of the motor is placed in the vertical direction. The plurality of rotor blades may generate thrust by rotating around the rotation axis of the motor. Each of the plurality of rotor blades rotates around a blade rotation axis perpendicular to the rotation axis of the motor, and the magnitude of the thrust may vary even when the rotor blades rotate at the same rotation speed. An angle at which the rotor blades rotate around the blade rotation axis is referred to as a pitch angle. As the pitch angle increases, the thrust generated by the rotor blades increases. The plurality of rotor blades may have the same pitch angle. In this case, a pitch angle of the same size of the plurality of rotor blade is referred to as a collective pitch angle.

The processor 20 may include a thrust command generator 100 that receives an input of a thrust command and generates a first collective pitch angle based on the thrust command, a rotation speed compensator 200 that generates a compensation value based on a target rotation speed and a current rotation speed of the motor, a compensation weight generator 300 that generates a first weight value and a second weight value based on flight speed, a collective pitch angle command generator 400 that generates final collective pitch angle adjustment command for the rotor blades based on the first collective pitch angle and a first compensation value that is obtained by multiplying the compensation value by a preset conversion ratio (col/esc ratio) and the first weight value, and a motor controller 500 that generates a motor control command based on the first collective pitch angle and a second compensation value that is obtained by multiplying the compensation value by the second weight value.

The computing apparatus 10 may further include, in addition to the elements shown in FIG. 1, additional elements such as an input apparatus for receiving inputs from a user, an output apparatus for outputting calculation results, and a communication apparatus for communicating with an external apparatus.

Figure 2:
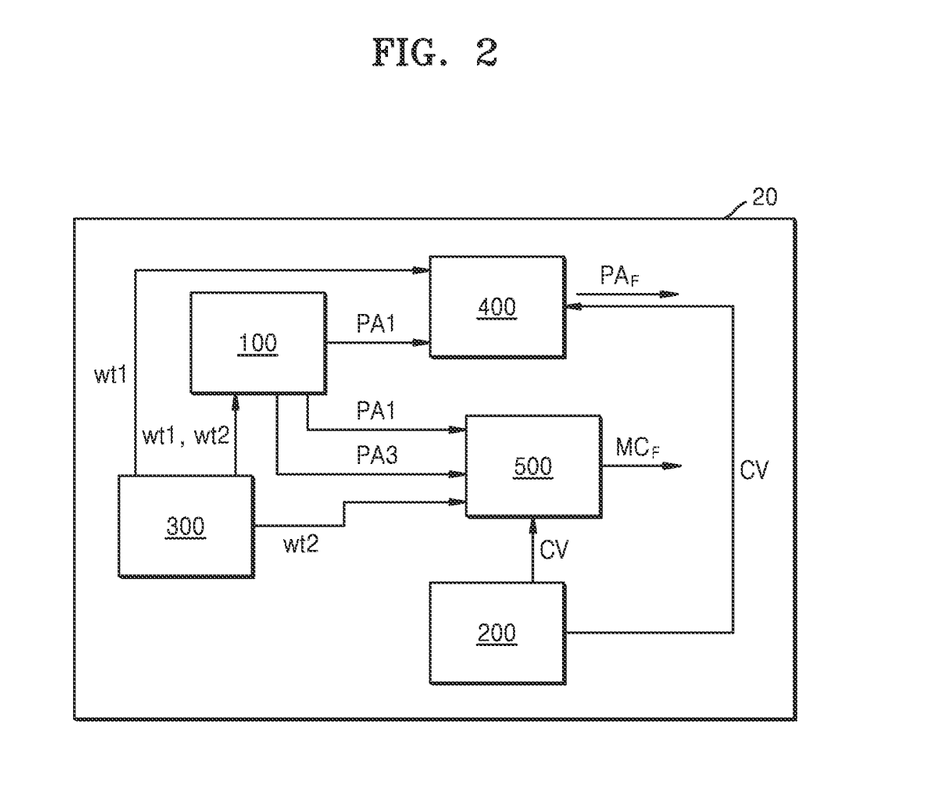
FIG. 2 is a schematic diagram of an internal configuration of a processor of a computing apparatus that executes an apparatus for controlling a tilt rotor, according to the disclosure.

FIG. 2 is a schematic diagram of an internal configuration of a processor of a computing apparatus that executes an apparatus for controlling a tilt rotor, according to the disclosure.

Referring to FIG. 2, the processor 20 includes the thrust command generator 100, the rotation speed compensator 200, the compensation weight generator 300, the collective pitch angle command generator 400, and the motor controller 500.

The thrust command generator 100 that has received an input of a throttle command may generate a first collective pitch angle PA1 and provide the first collective pitch angle PA1 to the collective pitch angle command generator 400 and the motor controller 500. Also, the thrust command generator 100 may generate a third collective pitch angle PA3 and provide the third collective pitch angle PA3 to the motor controller 500.

The rotation speed compensator 200 may generate a compensation value CV based on a difference between the target rotation speed and the current rotation speed of the motor.

The compensation weight generator 300 may generate a first weight value wt1 and a second weight value wt2 according to the flight speed, and provide the first weight value wt1 and the second weight value wt2 to the thrust command generator 100, the collective pitch angle command generator 400, and the motor controller 500.

The collective pitch angle command generator 400 may receive, as inputs, the first collective pitch angle PA1 from the thrust command generator 100, the compensation value CV from the rotation speed compensator 200, and the first weight value wt1 from the compensation weight generator 300. The collective pitch angle command generator 400 may output a final collective pitch angle adjustment value $PA_F$ based on the final collective pitch angle adjustment command, based on the input first collective pitch angle PA1 and compensation value CV, and a preset second pitch adjustment angle CS.

The motor controller 500 may receive, as inputs, the compensation value CV from the rotation speed compensator 200 and the first collective pitch angle PA1 and the third collective pitch angle PA3 from the thrust command generator 100, and output a motor control command value $MC_F$ according to the motor control command based on the compensation value CV, the first collective pitch angle PA1, and the third collective pitch angle PA3.

Figure 3:
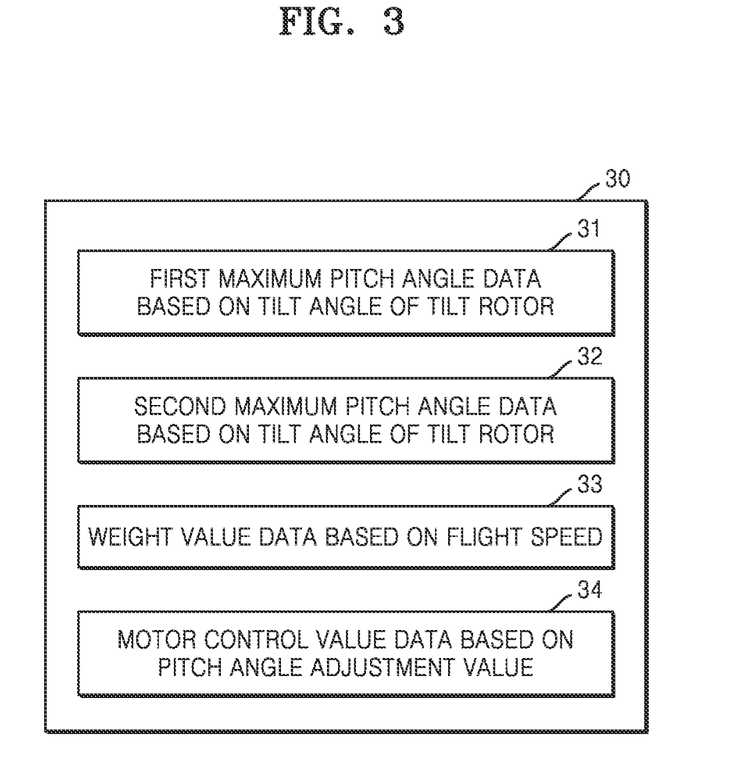
FIG. 3 is a diagram of a memory including data required to execute an apparatus for controlling a tilt rotor.

FIG. 3 is a diagram of a memory including data required to execute an apparatus for controlling a tilt rotor.

Referring to FIG. 3, the memory 30 may store first maximum pitch angle data 31 based on a tilt angle of the tilt rotor, second maximum pitch angle data 32 based on the tilt angle of the tilt rotor, weight value data 33 based on the flight speed, and motor control value data 34 based on a pitch angle adjustment value.

The first maximum pitch angle data 31 based on the tilt angle of the tilt rotor and the second maximum pitch angle data 32 based on the tilt angle of the tilt rotor may be used by the thrust command generator 100 to calculate a maximum pitch angle based on the tilt angle. For example, when the tilt angle of the tilt rotor is given, the thrust command generator 100 may determine a first maximum pitch angle corresponding to the tilt angle by using the first maximum pitch angle data 31 based on the tilt angle of the tilt rotor, determine a second maximum pitch angle corresponding to the tilt angle by using the second maximum pitch angle data 32 based on the tilt angle of the tilt rotor, and determine, as a maximum pitch angle, a value that is obtained by weighted averaging the first maximum pitch angle and the second maximum pitch angle.

According to the first maximum pitch angle data 31 based on the tilt angle of the tilt rotor and the second maximum pitch angle data 32 based on the tilt angle of the tilt rotor, when the tilt angle of the tilt rotor is 0°, a first maximum pitch angle $PA_{max}1$ based on the tilt angle may be 0°, and a second maximum pitch angle $PA_{max}2$ based on the tilt angle may have a value greater than 0°.

As the tilt angle increases, the first maximum pitch angle $PA_{max}1$ based on the tilt angle and the second maximum pitch angle $PA_{max}2$ based on the tilt angle may also increase. In addition, when the tilt angle is 90°, the first maximum pitch angle $PA_{max}1$ and the second maximum pitch angle $PA_{max}2$ may have a maximum value, for example, 20°.

When the tilt angle is 90°, the first maximum pitch angle $PA_{max}1$ and the second maximum pitch angle $PA_{max}2$ may be equal to each other.

The weight value data 33 based on the flight speed may be used by the compensation weight generator 300 to generate the first weight value wt1 and the second weight value wt2.

The motor control value data 34 based on the pitch angle adjustment value may be used by the motor controller 500 to generate a motor control command from a collective pitch angle adjustment value.

Figure 4:
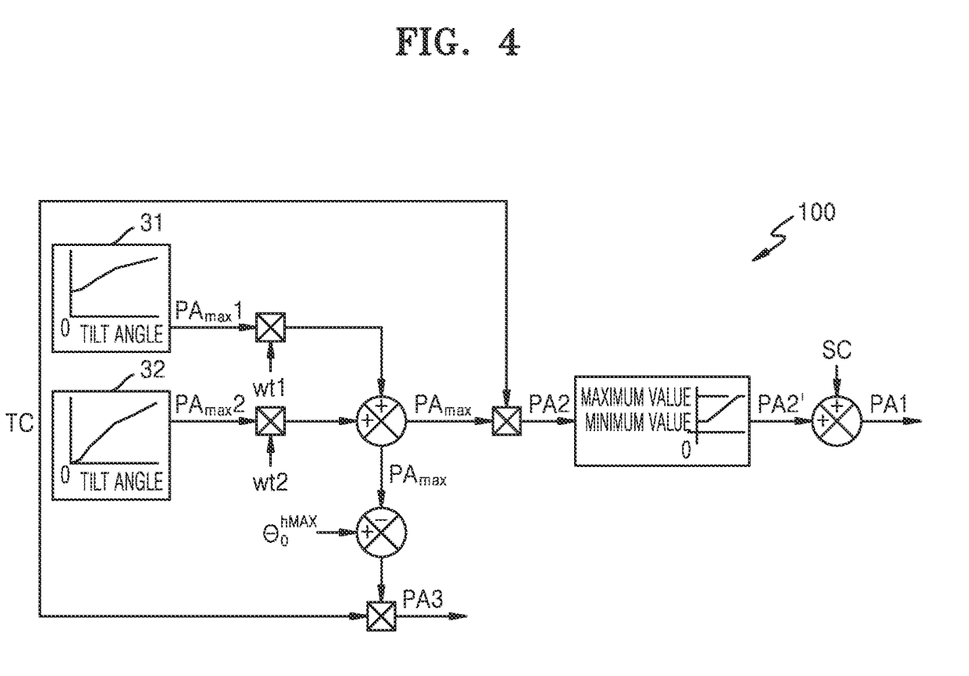
FIG. 4 is a conceptual diagram of a thrust command generator according to the disclosure.

FIG. 4 is a conceptual diagram of a thrust command generator according to the disclosure.

Referring to FIG. 4, the thrust command generator 100 may receive an input of a throttle command TC and generate a first collective pitch angle PA1 based on the throttle command TC. The throttle command TC may be provided from a pilot of a manned aircraft or an automatic controller of an unmanned aircraft, and may be referred to as a value of the throttle command TC. For example, the value of the throttle command TC may be between 0 and 1.

According to an embodiment, the thrust command generator 100 may generate a second collective pitch angle PA2 by multiplying, by the value of the throttle command TC, a weighted average value $PA_{max}$ that is obtained by weighted averaging the first maximum pitch angle $PA_{max}1$ based on the tilt angle and the second maximum pitch angle $PA_{max}2$ based on the tilt angle by using the first weight value wt1 and the second weight value wt2.

The first maximum pitch angle $PA_{max}1$ based on the tilt angle may be obtained using the first maximum pitch angle data 31 based on the tilt angle of the tilt rotor, which is pre-stored in the memory 30. The second maximum pitch angle $PA_{max}2$ based on the tilt angle may be obtained using the second maximum pitch angle data 32 based on the tilt angle of the tilt rotor, which is pre-stored in the memory 30. The weighted average value $PA_{max}$ is determined by a sum of a product of the first weight value wt1 and the first maximum pitch angle $PA_{max}1$ and a product of the second weight value wt2 and the second maximum pitch angle $PA_{max}2$. In this case, the first weight value wt1 and the second weight value wt2 may be generated by the compensation weight generator 300 according to the flight speed.

The thrust command generator 100 may generate the first collective pitch angle PA1 based on the second collective pitch angle PA2. According to an example, the thrust command generator 100 may generate the first collective pitch angle PA1 based on the second collective pitch angle PA2 and a first pitch adjustment angle SC according to a posture control command. For example, the thrust command generator 100 may generate the first collective pitch angle PA1 by adding the second collective pitch angle PA2 and the first pitch adjustment angle SC.

The first pitch adjustment angle SC may be adjusted according to the posture control command. The posture control command is a command for controlling the posture of an aircraft and may be in the form of a value that adjusts a pitch angle of each of the rotor blades of the tilt rotor. For example, in the case of a posture control command that turns the aircraft to the right, a tilt rotor located on the left needs to generate higher thrust than a tilt rotor located on the right, and thus, a positive (+) first pitch adjustment angle SC may be given to the tilt rotor located on the left, and a negative (−) first pitch adjustment angle SC may be provided to the tilt rotor located on the right. The first collective pitch angle PA1 may be generated by adding the first pitch adjustment angle SC to the second collective pitch angle PA2.

According to another example, the thrust command generator 100 may generate, from the second collective pitch angle PA2, a second limited collective pitch angle PA2' that limits the size of the second collective pitch angle PA2 within a preset range, and generate the first collective pitch angle PA1 by adding the second limited collective pitch angle PA2' and the first pitch adjustment angle SC. The preset range may be predefined with a minimum value and a maximum value. When the second collective pitch angle PA2 is less than or equal to the minimum value, the second limited collective pitch angle PA2' may have the minimum value constant, when the second collective pitch angle PA2 is greater than or equal to the maximum value, the second limited collective pitch angle PA2' may have the maximum value constant, and when the second collective pitch angle PA2 is between the minimum value and the maximum value, the second limited collective pitch angle PA2' may be equal to the second collective pitch angle PA2.

The thrust command generator 100 may generate a third collective pitch angle PA3 by multiplying, by the value of the throttle command TC, a value that is obtained by subtracting the weighted average value $PA_{max}$ from a maximum collective pitch angle $\Theta_0^{hMAX}$.

The maximum collective pitch angle $\Theta_0^{hMAX}$ may be preset, and may be equal to the first maximum pitch angle $PA_{max}1$ and the second maximum pitch angle $PA_{max}2$ when the tilt angle is 90°. For example, the maximum collective pitch angle $\Theta_0^{hMAX}$ may be 20°.

Figure 5:
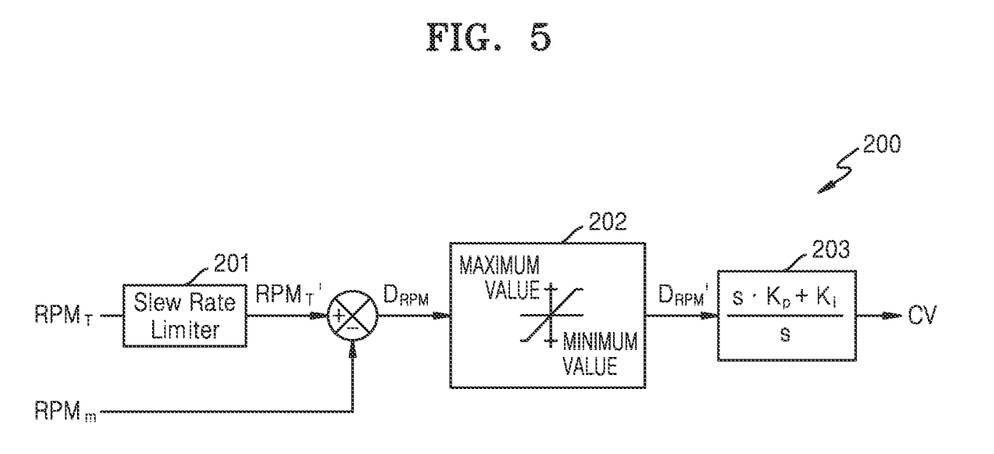
FIG. 5 is a conceptual diagram of a rotation speed compensator according to the disclosure.

FIG. 5 is a conceptual diagram of a rotation speed compensator according to the disclosure.

Referring to FIG. 5, the rotation speed compensator 200 may generate a compensation value CV based on a difference between a target rotation speed $RPM_T$ of the motor and a current rotation speed $RPM_m$ of the motor. The target rotation speed $RPM_T$ may be preset according to an aircraft or according to a flight mode of the aircraft. For example, the target rotation speed $RPM_T$ may be 3000 rpm. The target rotation speed $RPM_T$ in a fixed blade mode and the target rotation speed $RPM_T$ in a rotary blade mode may be different from each other. The current rotation speed $RPM_m$ may be directly detected by the rotation speed compensator 200 through a sensor or may be received from the aircraft.

The rotation speed compensator 200 may include a first limiter 201, a second limiter 202, and a controller 203.

According to an example, the rotation speed compensator 200 may multiply, by a proportional gain value and an integral gain value, an error value that is obtained by subtracting the current rotation speed $RPM_m$ from the target rotation speed $RPM_T$ of the motor, and may output a product as a compensation value CV. The proportional gain value and the integral gain value may be coefficients that control proportional control and integral control, respectively. For example, the proportional gain value and the integral gain value are values for controlling the error value to correct the current rotation speed $RPM_m$ to the target rotation speed $RPM_T$, and may be arbitrarily set by using a mathematical or experimental method.

According to another example, in order to prevent the target rotation speed $RPM_T$ from rapidly changing when the mode of the aircraft changes, the first limiter 201 may generate a corrected target rotation speed $RPM_T'$ by correcting the target rotation speed $RPM_T$. The rotation speed compensator 200 may generate the compensation value CV based on a value that is obtained by subtracting the current rotation speed $RPM_m$ from the corrected target rotation speed $RPM_T'$.

According to another example, the second limiter 202 may generate a limited error value $D_{RPM}'$ by limiting, within a preset range, an error value $D_{RPM}$ that is generated based on the difference between the target rotation speed $RPM_T$ and the current rotation speed $RPM_m$. The preset range may be defined with a minimum value and a maximum value. For example, even when the error value $D_{RPM}$ is less than the minimum value, the limited error value $D_{RPM}'$ has the minimum value, and even when the error value $D_{RPM}$ is greater than the maximum value, the limited error value $D_{RPM}'$ has the maximum value. When the error value $D_{RPM}$ is within the preset range, the limited error value $D_{RPM}'$ is equal to the error value $D_{RPM}$. The rotation speed compensator 200 may generate the compensation value CV based on the limited error value $D_{RPM}'$. The second limiter 202 may be a change rate limiter.

According to another example, the controller 203 may calculate the compensation value CV according to $u(t)=K_p e(t)+K_I \int_0^t e(t)dt$ based on the limited error value $D_{RPM}'$ that is generated by the second limiter 202. In this case, $e(t)$ may be the limited error value $D_{RPM}'$, and $u(t)$ may be the compensation value CV. $e(t)$ may also be the error value $D_{RPM}$. $K_p$ may be the proportional gain value, and $K_I$ may be the integral gain value.

The rotation speed compensator 200 generates the compensation value CV by multiplying the limited error value $D_{RPM}'$ by a proportional-integral gain through proportional integral (PI) control by the controller 203, and accordingly, when the current rotation speed $RPM_m$ of the motor rapidly changes, the motor control command value $MC_F$ also rapidly changes in response to the rapid change of the current rotation speed $RPM_m$, thereby preventing shaking. Also, when there is a time delay in the current rotation speed $RPM_m$ of the motor, which is input to the rotation speed compensator 200, the compensation value CV may also be generated by adding a differential gain $K_d de/dt$ to the above equation. $K_d$ may be a differential gain value. The differential gain value may be a coefficient that adjusts differential control. For example, the differential gain value may be arbitrarily set mathematically or experimentally, like the proportional gain value and the integral gain value. For example, when the target rotation speed $RPM_T$ of the motor is greater than the current rotation speed $RPM_m$, the rotation speed compensator 200 may generate a compensation value CV having a negative (−) value. According to the disclosure, the motor control command value $MC_F$ may decrease based on the compensation value CV having a negative (−) value, thereby lowering an output of the motor, and the final collective pitch angle adjustment value $PA_F$ may increase based on the compensation value CV having a negative (−) value, thereby increasing a load of the motor. Accordingly, the current rotation speed $RPM_m$ may be reduced up to the target rotation speed $RPM_T$.

Also, when the current rotation speed $RPM_m$ is less than the target rotation speed $RPM_T$, the compensation value CV generated by the rotation speed compensator 200 has a positive (+) value. In this case, in order for the current rotation speed $RPM_m$ to increase up to the target rotation speed $RPM_T$, the output of the motor is increased by increasing the motor control command value $MC_F$ based on the compensation value CV having a positive (+) value, and the load of the motor is lowered by reducing the final collective pitch angle adjustment value $PA_F$ based on the compensation value CV having a positive (+) value, and thus, a large load may be prevented from being applied to the motor while maintaining the rotation speed of the motor constant.

According to another example, the controller 203 may limit an integral value such that a value exceeding a preset compensation value limit is not accumulated. According to another example, when the limited error value $D_{RPM}'$ exceeds the preset compensation value limit, the controller 203 may generate the compensation value CV by removing an excess value. For example, the controller 203 may generate the compensation value CV by removing a weighted average value that is obtained by adding a value obtained by multiplying an excess value based on a first compensation value CV1 by the first weight value wt1 and a value obtained by multiplying an excess value based on a second compensation value CV2 by the second weight value wt2.

Figure 6:
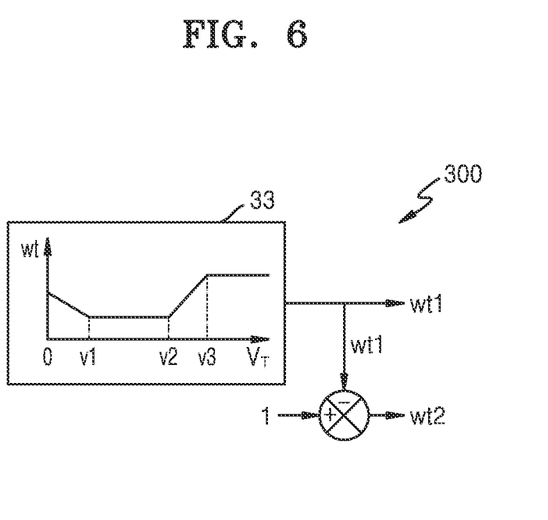
FIG. 6 is a conceptual diagram of a compensation weight generator according to the disclosure.

FIG. 6 is a conceptual diagram of a compensation weight generator according to the disclosure.

Referring to FIG. 6, the compensation weight generator 300 may generate the first weight value wt1 and the second weight value wt2 based on the flight speed of the aircraft.

According to an example, the first weight value wt1 is a value generated from the weight value data 33 based on the flight speed. The second weight value wt2 is a value obtained by subtracting the first weight value wt1 from 1, and a sum of the first weight value wt1 and the second weight value wt2 is 1. For example, the first weight value wt1 may have a value between 0 and 0.5, and the second weight value wt2 may have a value between 0.5 and 1. The first weight value wt1 may be greater than 0.

The first weight value wt1 indicates a ratio at which the compensation value CV is reflected in the final collective pitch angle adjustment value $PA_F$, and the second weight value wt2 indicates a ratio at which the compensation value CV is reflected in the motor control command value $MC_F$. Also, the first weight value wt1 may indicate a ratio reflecting the first maximum pitch angle $PA_{max}1$ based on the tilt angle when determining a maximum pitch angle $PA_{max}$, and the second weight value wt2 may indicate a ratio reflecting the second maximum pitch angle $PA_{max}2$ based on the tilt angle when determining the maximum pitch angle $PA_{max}$.

Referring to the weight value data 33 based on the flight speed, the first weight value wt1 may have a smallest value between a first flight speed v1 and a second flight speed v2 and may have a largest value at or above a third flight speed v3. Also, when a flight speed $V_t$ is 0, the first weight value wt1 may have a value greater than a minimum weight value. As the flight speed $V_t$ increases between 0 and the first flight speed v1, the first weight value wt1 may decrease. As the flight speed $V_t$ increases between the second flight speed v2 and the third flight speed v3, the first weight value wt1 may increase.

For example, when the aircraft vertically climbs in the rotary blade mode or when the aircraft flies forward at high speed in the fixed blade mode, the load of the motor is large. In this case, the first weight value wt1 has a relatively large value according to the weight value data 33 based on the flight speed. When the aircraft vertically climbs in the rotary blade mode, the flight speed $V_t$ may be relatively very slow and close to 0. Also, when the aircraft flies forward at high speed in the fixed blade mode, the flight speed $V_t$ may be higher than or equal to the third flight speed v3.

In contrast, when the aircraft flies at low to medium speeds in the fixed blade mode or flies in a high-speed transition mode, the load of the motor is small. In this case, the first weight value wt1 has a relatively small value according to the weight value data 33 based on the flight speed. That is, when the aircraft flies at low to medium speeds in the fixed blade mode or flies in the high-speed transition mode, the flight speed $V_t$ may be at least the first flight speed v1 but no more than the second flight speed v2. In this case, because the load of the motor has margin, overload does not occur in the motor even when the compensation value CV is mainly reflected in the motor control command value $MC_F$.

Figure 7:
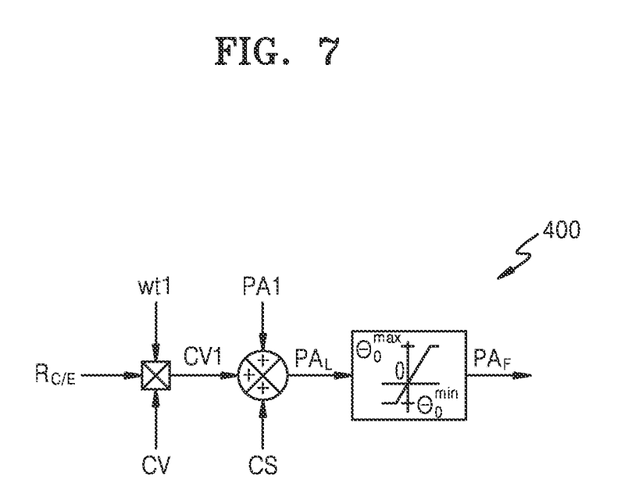
FIG. 7 is a conceptual diagram of a collective pitch angle command generator according to the disclosure.

FIG. 7 is a conceptual diagram of a collective pitch angle command generator according to the disclosure.

Referring to FIG. 7, the collective pitch angle command generator 400 may generate a final collective pitch angle adjustment value $PA_F$ based on a final collective pitch angle adjustment command for the rotor blades of the tilt rotor, based on a value obtained by adding the first compensation value CV1, the first collective pitch angle PA1 generated by the thrust command generator 100, and the second pitch adjustment angle CS based on the tilt angle or speed of the tilt rotor.

According to an example, the collective pitch angle command generator 400 may generate the final collective pitch angle adjustment value $PA_F$ by adding, to the first compensation value CV1, the first collective pitch angle PA1 and the second pitch adjustment angle CS based on the tilt angle.

The first compensation value CV1 may be a product of the compensation value CV generated by the rotation speed compensator 200, the first weight value wt1 generated by the compensation weight generator 300, and a conversion ratio $R_{C/E}$.

The conversion ratio $R_{C/E}$ may be preset to a negative (−) value. For example, when the current rotation speed $RPM_m$ is less than the target rotation speed $RPM_T$, the current rotation speed $RPM_m$ needs to increase, and the compensation value CV generated by the rotation speed compensator 200 has a positive (+) value. When the output of the motor increases, the rotation speed of the motor increases. Also, when the pitch angle of the rotor blades decreases, the load of the motor decreases, and the rotation speed of the motor increases.

According to the disclosure, in order to increase the rotation speed of the motor, a motor control command value $MC_F$ proportional to the compensation value CV having a positive (+) value may be generated. And, a final collective pitch angle adjustment value $PA_F$ may be generated based on a value that is obtained by multiplying the compensation value CV having a positive (+) value by the conversion ratio $R_{C/E}$ having a negative (−) value.

The second pitch adjustment angle CS may be preset according to the flight speed of the aircraft. For example, the second pitch adjustment angle CS may be preset to have a large value as the flight speed increases, and the second pitch adjustment angle CS may be preset to have a small value as the flight speed decreases.

According to another example, the second pitch adjustment angle CS may be preset according to the tilt angle of the tilt rotor. For example, the second pitch adjustment angle CS may be preset to have a small value when the tilt angle is large, and the second pitch adjustment angle CS may be preset to have a large value when the tilt angle is small. For example, when the tilt angle is 90°, that is, when the aircraft is in the rotary blade mode, the second pitch adjustment angle CS may be 0°, and when the tilt angle is 0°, that is, when the aircraft is in the fixed blade mode, the second pitch adjustment angle CS may have a value of 20°. According to another example, the second pitch adjustment angle CS may be preset according to the flight speed of the aircraft and the tilt angle of the tilt rotor.

Accordingly, when the aircraft is in the rotary blade mode, the final collective pitch angle adjustment value $PA_F$ may be determined as a value between 0° and 20°, and a maximum value of the final collective pitch angle adjustment value $PA_F$ may be 20°. In contrast, when the aircraft is in the fixed blade mode, the final collective pitch angle adjustment value $PA_F$ may be determined as a value between 20° and 40°, and the maximum value of the final collective pitch angle adjustment value $PA_F$ may be 40°.

The second pitch adjustment angle CS based on the tilt angle may be preset even when the tilt angle is between 0° and 90°, and data about the second pitch adjustment angle CS based on the tilt angle may be stored in advance in the motor control value data 34 based on the pitch angle adjustment value in the memory 30.

According to another example, the collective pitch angle command generator 400 may generate a collective pitch angle adjustment value $PA_L$ by adding the first collective pitch angle PA1 and the second pitch adjustment angle CS to the first compensation value CV1, and generate the final collective pitch angle adjustment value $PA_F$ by limiting the collective pitch angle adjustment value $PA_L$ within a preset range. The preset range may be predefined as a minimum collective pitch angle value $\Theta_0^{min}$ and a maximum collective pitch angle value $\Theta_0^{max}$.

The final collective pitch angle adjustment value $PA_F$ may have the minimum collective pitch angle value $\Theta_0^{min}$ constant even when the collective pitch angle adjustment value $PA_L$ is less than the minimum collective pitch angle value $\Theta_0^{min}$, and may have the maximum collective pitch angle value $\Theta_0^{max}$ constant even when the limited collective pitch angle adjustment value $PA_L$ is greater than the maximum collective pitch angle value $\Theta_0^{max}$. When the collective pitch angle adjustment value $PA_L$ ranges between the minimum collective pitch angle value $\Theta_0^{min}$ and the maximum collective pitch angle value $\Theta_0^{max}$, the final collective pitch angle adjustment value $PA_F$ may have the same value as the collective pitch angle adjustment value $PA_L$.

Figure 8:
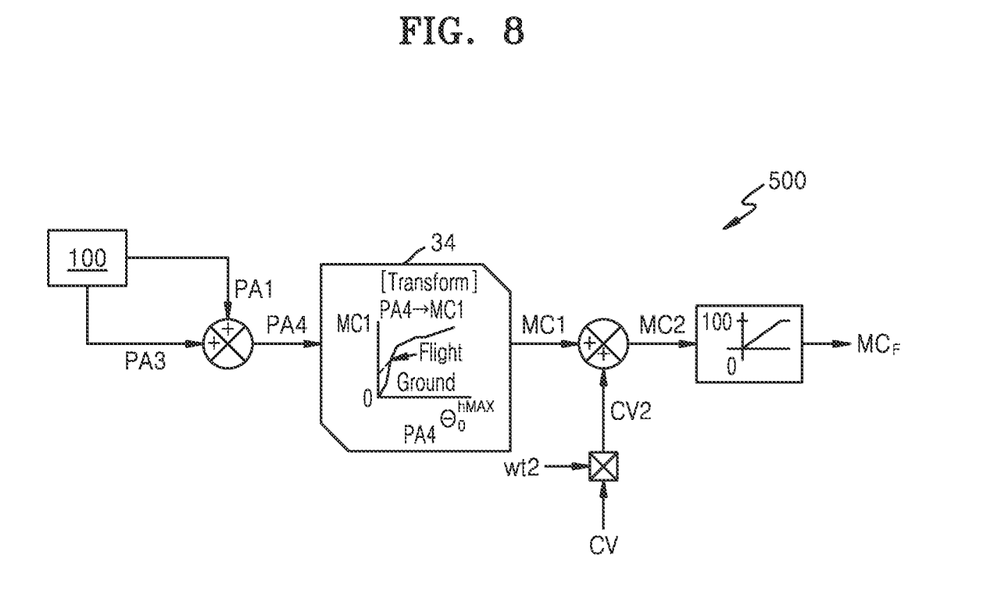
FIG. 8 is a conceptual diagram of a motor controller according to the disclosure.

FIG. 8 is a conceptual diagram of a motor controller according to the disclosure.

Referring to FIG. 8, the motor controller 500 may generate a first motor control value MC1 based on a pitch angle adjustment value PA4 that is obtained by adding the first collective pitch angle PA1 and the third collective pitch angle PA3 generated by the thrust command generator 100, and may generate a motor control command value $MC_F$ based on a value that is obtained by adding the first motor control value MC1 and the second compensation value CV2. The second compensation value CV2 is a value obtained by multiplying the compensation value CV by the second weight value wt2. According to an example, the motor controller 500 may convert the pitch angle adjustment value PA4 to the first motor control value MC1 by using the motor control value data 34 based on the pitch angle adjustment value.

Referring to the motor control value data 34 based on the pitch angle adjustment value, in a ground mode in which the aircraft is located on the ground, the first motor control value MC1 may have a value of 0 when the pitch angle adjustment value PA4 is 0, and may increase as the pitch angle adjustment value PA4 increases. When the pitch angle adjustment value PA4 is less than a reference value, the first motor control value MC1 may rapidly increase, and when the pitch angle adjustment value PA4 is greater than the reference value, the first motor control value MC1 may gradually increase.

In a flight mode in which the aircraft is flying, the first motor control value MC1 may have a value greater than 0 when the pitch angle adjustment value PA4 is 0. Accordingly, the motor may maintain a minimum output when the aircraft is in the air. When the pitch angle adjustment value PA4 is greater than 0 and less than the reference value, increasing rate of the first motor control value MC1 may be smaller than increasing rate in the ground mode, and when the pitch angle adjustment value PA4 is greater than or equal to the reference value, the first motor control value MC1 in the flight mode may have the same value as the first motor control value MC1 in the ground mode.

According to an example, the motor controller 500 may generate the motor control command value $MC_F$ by adding the first motor control value MC1 and the second compensation value CV2.

According to another example, the motor controller 500 may generate a second motor control value MC2 by adding the first motor control value MC1 and the second compensation value CV2, and generate the motor control command value $MC_F$ based on the second motor control value MC2. For example, the motor controller 500 may generate the motor control command value $MC_F$ by multiplying the second motor control value MC2 by $V_0/V(t)$. In this case, $V_0$ refers to an initial battery voltage of a battery module driving the motor, and V(t) refers to a current battery voltage of the battery module. By reflecting the current battery voltage V(t) of the battery module in the second motor control value MC2, a certain amount of power may be supplied to the motor according to the motor control command value $MC_F$. The motor control command value $MC_F$ may be limited through a limiter to have a value between 0 and 100.

In addition, the motor control command value $MC_F$ may have a value between 0 and 100, and the final collective pitch angle adjustment value $PA_F$ may have a value between 0° and 20° in the rotary blade mode and may have a value between 20° and 40° in the fixed blade mode.

The motor control command value $MC_F$ has an operating range of 100, while the final collective pitch angle adjustment value $PA_F$ has an operating range of 20, and thus, the conversion ratio $R_{C/E}$ may have a value of about −0.2.

Figure 9:
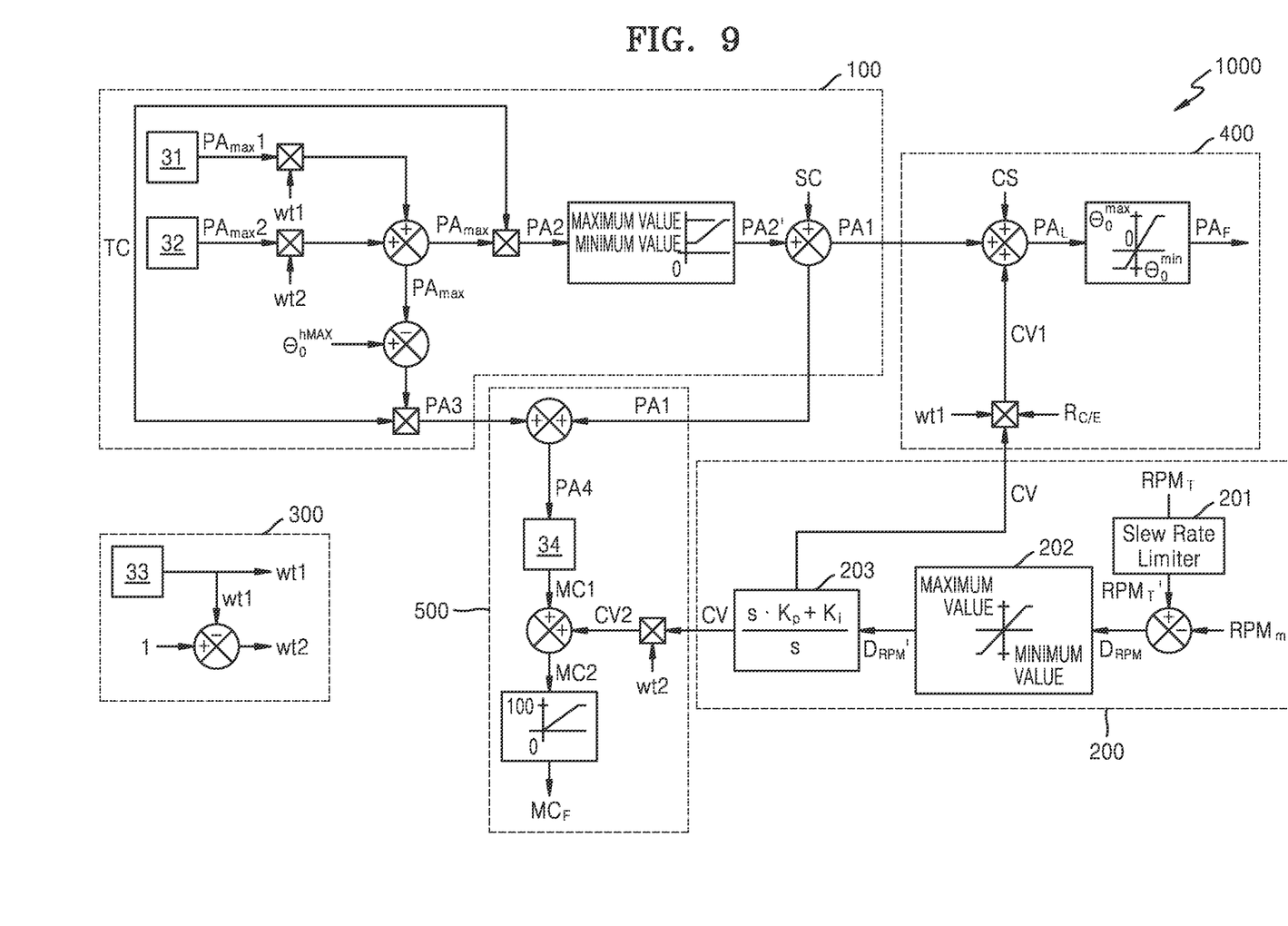
FIG. 9 is a schematic block diagram of an overall configuration of an apparatus for controlling a tilt rotor, according to the disclosure.

FIG. 9 is a schematic block diagram of an overall configuration of an apparatus for controlling a tilt rotor, according to the disclosure.

Referring to FIG. 9, an overall block diagram of an apparatus 1000 for controlling the tilt rotor is a more detailed diagram of a block diagram of the processor 20 for executing the apparatus 1000 for controlling the tilt rotor in FIG. 2.

The thrust command generator 100 may generate a weighted average value $PA_{max}$ based on an input throttle command TC, the first maximum pitch angle data 31 based on the tilt angle of the tilt rotor, and the second maximum pitch angle data 32 based on the tilt angle of the tilt rotor. The thrust command generator 100 may generate a first collective pitch angle PA1 based on the weighted average value $PA_{max}$, the throttle command TC, and the first pitch adjustment angle SC, and provide the first collective pitch angle PA1 to the collective pitch angle command generator 400 and the motor controller 500. Also, the thrust command generator 100 may generate a third collective pitch angle PA3 based on a preset maximum collective pitch angle $\Theta_0^{hMAX}$, the weighted average value $PA_{max}$, and the throttle command TC, and provide the third collective pitch angle PA3 to the motor controller 500.

The rotation speed compensator 200 may generate a compensation value CV based on a value that is obtained by subtracting the current rotation speed $RPM_m$ from the target rotation speed $RPM_T$ of the motor.

The compensation weight generator 300 may generate a first weight value wt1 and a second weight value wt2 according to the weight value data 33 based on the flight speed, and provide the first weight value wt1 and the second weight value wt2 to the thrust command generator 100, the collective pitch angle command generator 400, and the motor controller 500.

The collective pitch angle command generator 400 may output a final collective pitch angle adjustment value $PA_F$ based on a first compensation value CV1 that is generated by multiplying the compensation value CV input from the rotation speed compensator 200 by the first weight value wt1 and a preset conversion ratio (col/esc ratio), the first collective pitch angle PA1, and a preset second pitch adjustment angle CS.

The motor controller 500 may receive, as inputs, a second compensation value CV2 that is obtained by multiplying the compensation value CV input from the rotation speed compensator 200 by the second weight value wt2, and the first collective pitch angle PA1 and the third collective pitch angle PA3 from the thrust command generator 100, and may output a motor control command value $MC_F$ according to the motor control command, based on the motor control value data 34 based on the pitch angle adjustment value.

As described above, various embodiments of the disclosure have been described with some examples, but the description of various embodiments in the "detailed description" section is merely illustrative, and those of ordinary skill in the art will understand from the above description that the disclosure can be implemented with various modifications or equivalent implementations of the disclosure.

In addition, because the disclosure can be implemented in various other forms, the disclosure is not limited by the above description, and the above description is provided to ensure that the disclosure is complete and to fully inform those of ordinary skill in the art of the scope of the disclosure. Also, it should be understood that the disclosure is only defined by each claim in the claims.

According to the disclosure, a compensation value that compensates for a rotation speed of a motor is applied not only to a motor control command but also to a collective pitch angle adjustment value, and a ratio of applying the compensation value to the motor control command and the collective pitch angle adjustment value is changed according to a flight speed of an aircraft including a plurality of tilt rotors, and thus, even when the aircraft including the plurality of tilt rotors vertically climbs or flies at high speed, overload on the motor may be prevented. Therefore, the life of the tilt rotors may be increased, and safety during aircraft operation may be increased.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for controlling a tilt rotor including a motor and a rotor blade, the apparatus comprising:

a thrust command generator configured to receive an input of a throttle command and generate a first collective pitch angle based on the throttle command;
a rotation speed compensator configured to generate a compensation value based on a target rotation speed and a current rotation speed of the motor;
a compensation weight generator configured to generate a first weight value and a second weight value according to a flight speed;
a collective pitch angle command generator configured to generate a final collective pitch angle adjustment command for the rotor blade, based on a first compensation value and the first collective pitch angle, the first compensation value being obtained by multiplying the compensation value by a preset conversion ratio (col/esc ratio) and the first weight value; and
a motor controller configured to generate a motor control command based on a second compensation value and the first collective pitch angle, the second compensation value being obtained by multiplying the compensation value by the second weight value.

2. The apparatus of claim 1, wherein the thrust command generator is further configured to generate a second collective pitch angle by multiplying a weighted average value by a throttle command value corresponding to the throttle command, and generate the first collective pitch angle based on the second collective pitch angle, the weighted average value being obtained by weighted averaging a first maximum pitch angle based on a tilt angle of the tilt rotor and a second maximum pitch angle based on the tilt angle of the tilt rotor by using the first weight value and the second weight value.

3. The apparatus of claim 2, wherein the thrust command generator is further configured to generate the first collective pitch angle based on the second collective pitch angle and a first pitch adjustment angle, the first pitch adjustment angle being adjusted by a posture control command.

4. The apparatus of claim 2, wherein, when the tilt angle of the tilt rotor is 0, the first maximum pitch angle based on the tilt angle of the tilt rotor is 0, and the second maximum pitch angle based on the tilt angle of the tilt rotor is greater than 0, and
as the tilt angle of the tilt rotor increases, the first maximum pitch angle based on the tilt angle of the tilt rotor and the second maximum pitch angle based on the tilt angle of the tilt rotor increase.

5. The apparatus of claim 2, wherein the motor controller is further configured to generate the motor control command based on a value obtained by adding a third collective pitch angle, the first collective pitch angle, and the second compensation value, the third collective pitch angle being generated by multiplying, by the throttle command value, a value obtained by subtracting the weighted average value from a preset maximum collective pitch angle.

6. The apparatus of claim 5, wherein the motor controller is further configured to generate the motor control command based on a value obtained by adding the second compensation value and a motor control value preset according to a value obtained by adding the first collective pitch angle and the third collective pitch angle.

7. The apparatus of claim 1, wherein the first weight value is smallest between a first flight speed and a second flight speed and is largest at a third flight speed, the third flight speed being greater than the first flight speed and the second flight speed, and
a sum of the first weight value and the second weight value is 1.

8. The apparatus of claim 1, wherein the collective pitch angle command generator is further configured to generate the final collective pitch angle adjustment command based on a value obtained by adding the first compensation value, the first collective pitch angle, and a second pitch adjustment angle preset according to the flight speed,
wherein the second pitch adjustment angle increases as the flight speed increases.

9. The apparatus of claim 1, wherein the rotation speed compensator comprises:
a first limiter configured to limit the target rotation speed not to rapidly change according to an aircraft mode change;
a second limiter configured to limit an error value within a preset range, the error value being generated based on a difference between the target rotation speed and the current rotation speed; and
a controller configured to generate the compensation value based on at least one gain value among a proportional gain value, a differential gain value, and an integral gain value, the proportional, differential, and integral gain values being arbitrarily preset to the limited error value.

10. The apparatus of claim 9, wherein the controller is further configured to, in order for a value greater than or equal to a compensation value limit not to be accumulated, limit an integral value, or when an excess value greater than or equal to the compensation value limit occurs, remove the excess value.

11. The apparatus of claim 10, wherein the controller is further configured to, when the excess value is removed, remove a weighted average value obtained by multiplying excess values according to the first compensation value and the second compensation value by the first weight value and the second weight value, respectively, and then adding products.

12. A method of controlling a tilt rotor including a motor and a rotor blade, the method being performed by a computing apparatus, the method comprising:
receiving an input of a throttle command and generating a first collective pitch angle based on the throttle command;
generating a compensation value based on a target rotation speed and a current rotation speed of the motor;
generating a first weight value and a second weight value according to a flight speed;
generating a final collective pitch angle adjustment command of the rotor blade, based on a first compensation value and the first collective pitch angle, the first compensation value being obtained by multiplying the compensation value by a preset conversion ratio (col/esc ratio) and the first weight value; and
generating a motor control command based on a second compensation value and the first collective pitch angle, the second compensation value being obtained by multiplying the compensation value by the second weight value.

13. The method of claim 12, wherein the final collective pitch angle adjustment command is generated based on a value obtained by adding the first compensation value, the first collective pitch angle, and a second pitch adjustment angle preset according to the flight speed,
wherein the second pitch adjustment angle increases as the flight speed increases.

14. A computer program stored on a medium to execute the method of any one of claim 12 using a computer apparatus.

15. An aircraft comprising:
an aircraft main body;
a tilt rotor mounted on the aircraft main body and including a motor and a rotor blade; and
a control apparatus configured to control the tilt rotor,
wherein the control apparatus comprises:
a thrust command generator configured to receive an input of a throttle command and generate a first collective pitch angle based on the throttle command;
a rotation speed compensator configured to generate a compensation value based on a target rotation speed and a current rotation speed of the motor;
a compensation weight generator configured to generate a first weight value and a second weight value according to a flight speed;
a collective pitch angle command generator configured to generate a final collective pitch angle adjustment command of the rotor blade, based on a first compensation value and the first collective pitch angle, the first compensation value being obtained by multiplying the compensation value by a preset conversion ratio (col/esc ratio) and the first weight value; and
a motor controller configured to generate a motor control command based on a second compensation value and the first collective pitch angle, the second compensation value being obtained by multiplying the compensation value by the second weight value.

* * * * *